United States Patent
Ohtsuka et al.

(10) Patent No.: US 7,461,240 B2
(45) Date of Patent: Dec. 2, 2008

(54) COMMAND EXECUTION CONTROLLING APPARATUS, COMMAND EXECUTION INSTRUCTING APPARATUS AND COMMAND EXECUTION CONTROLLING METHOD

(75) Inventors: Katsushi Ohtsuka, Chiba (JP); Takeshi Yamazaki, Kanagawa (JP)

(73) Assignee: Sony Computer Entertainment Inc., Tokyo (JP)

( * ) Notice: Subject to any disclaimer, the term of this patent is extended or adjusted under 35 U.S.C. 154(b) by 34 days.

(21) Appl. No.: 11/432,107

(22) Filed: May 11, 2006

(65) Prior Publication Data

US 2006/0277437 A1    Dec. 7, 2006

(30) Foreign Application Priority Data

May 12, 2005    (JP)    ............................. 2005-139664

(51) Int. Cl.
*G06F 13/28*    (2006.01)

(52) U.S. Cl. .................... 712/220; 709/248

(58) Field of Classification Search .............. 712/220; 709/248

See application file for complete search history.

(56) References Cited

U.S. PATENT DOCUMENTS

| | | | | |
|---|---|---|---|---|
| 5,721,921 A * | 2/1998 | Kessler et al. | ............... | 718/102 |
| 5,802,374 A * | 9/1998 | Gupta et al. | ............... | 717/149 |
| 5,832,261 A * | 11/1998 | Ishizaka et al. | ............. | 718/100 |
| 5,887,143 A * | 3/1999 | Saito et al. | ................... | 709/248 |
| 6,085,263 A | 7/2000 | Sharma et al. | | |
| 6,216,174 B1 * | 4/2001 | Scott et al. | .................. | 713/375 |
| 6,263,406 B1 * | 7/2001 | Uwano et al. | ............... | 711/141 |
| 6,292,939 B1 * | 9/2001 | Itou et al. | .................. | 717/149 |
| 6,466,988 B1 * | 10/2002 | Sukegawa et al. | ........... | 709/248 |
| 6,609,192 B1 * | 8/2003 | Guthrie et al. | .............. | 712/216 |
| 6,643,718 B1 * | 11/2003 | Chen et al. | .................... | 710/55 |
| 7,117,496 B1 * | 10/2006 | Ramesh et al. | .............. | 718/102 |

OTHER PUBLICATIONS

International Search Report and Written Opinion based on PCT/JP2006/309877, dated Oct. 17, 2006, 12 pgs.

Jeong et al.; An effective out-of-order execution control scheme for an embedded floating point coprocessor; Microprocessors And Microsystems, IPC Business Press Ltd.,—London, GB, vol. 27, No. 4, May 20, 2003; pp. 171-180; XP004423866.

Chang et al.; "The effects of explicitly parallel mechanisms on the multi-ALU processor cluster pipeline;" Computer Design: VLSI In Computers And Processors, 1998,—ICCD '98 Proceedings International Conf. on Austin TX, Oct. 5-7, 1998; Los Alamitos, CA, IEEE Comput. Soc., US, Oct. 5, 1998, pp. 474-481; XP010310318.

* cited by examiner

*Primary Examiner*—Eric Coleman
(74) *Attorney, Agent, or Firm*—Matthew B. Dernier; Gibson & Dernier LLP (57) ABSTRACT

The issuance timing of commands received from and transmitted to among a plurality of processing units is controlled efficiently. An execution command storage unit 222 stores execution commands, received from an external command transmitting entity, where a predetermined upper-limit number of execution commands to be stored is set. An execution command issuing unit 230 retrieves the execution commands stored and issues them to a command execution entity. An adjustment command storage unit 224 stores the adjustment command, transmitted from the command transmitting entity, to adjust the issuance order of the execution commands. A storage area for storing the execution commands to be stored in the execution command storage unit 222 and a storage area for storing the adjustment command to be stored in the adjustment command storage unit 224 are separately provided. When the adjustment command is stored, the execution command issuing unit 230 issues an execution command received after the reception of the adjustment command, on the condition that the issuance of execution commands received prior to the reception of the adjustment command has been completed.

23 Claims, 5 Drawing Sheets

COMMAND EXECUTION CONTROLLING APPARATUS, COMMAND EXECUTION INSTRUCTING APPARATUS AND COMMAND EXECUTION CONTROLLING METHOD

BACKGROUND OF THE INVENTION

This invention relates to technologies by which to control the execution of commands, and it particularly relates to a technology by which to control the issuing order of commands received from an external source.

Along with recent years' marked advance of computer graphics technology and image processing technology, which are used in the areas of computer games, digital broadcasting and the like, there is demand for information processing apparatuses, such as computers, game machines and televisions, to have the capacity to process image data of higher definition at higher speed. To meet such demand, it goes without saying that it is necessary to realize high speed of arithmetic processing itself, but it is just as important to appropriately share the tasks among a plurality of processing units.

In so doing, control commands (hereinafter simply referred to as "command") for instructing the execution of tasks to one another are sent and received among a plurality of processing units, and thus the processing units operate in linkage with one another. For example, a processing unit A transmits a variety of commands to another processing unit B. The processing unit B queues the received commands in its own queue. The processing unit B executes the commands in the queue in the order of ones easier to execute. This type of processing, namely, command queuing and out-of-order execution, is widely employed as an effective technique in having the processing unit A and the processing unit B operate asynchronously and raising the processing efficiency of a plurality of processing units as a whole.

According to a command queuing and out-of-order execution as mentioned above, once the processing unit A transmits a command to the processing unit B, it has, in fact, no need to know the state of processing at the processing unit B. Yet, among commands, there are ones that must be executed according to the command processing state at the processing unit B. For example, when a processing unit A transmits to a processing unit B an operation instructing command for instructing a predetermined arithmetic operation and follows this up by a transmission of a read command for instructing the readout of the operation results, it is necessary that the read command be executed after the completion of the execution of the operation instructing command.

If the processing unit B is to adjust the execution order in light of the contents of the commands when carrying out an out-of-order execution of the commands in its queue, there will be much burden on the processing unit B. On the other hand, if the processing unit A is to control the transmission timing of a read command according to the command processing state of the processing unit B, there will be much burden on the processing unit A. In either of the methods, it is necessary for the processing unit A and the processing unit B to detect more or less of each other's state, and the situation like this can be a cause for worsened processing efficiency of a plurality of processing units as a whole.

SUMMARY OF THE INVENTION

The present invention has been made to address the foregoing problems and an objective thereof is to provide a technology for efficiently controlling the commands that are transmitted and received among a plurality of processing units.

An embodiment according to the present invention relates to a command execution controlling apparatus.

This apparatus receives execution commands from an external command transmitting entity, and stores them wherein a predetermined upper-limit number of execution commands to be stored is set. The execution commands stored are retrieved and issued to a command execution entity according to an issuance order determined among the execution commands.

This apparatus receives also an adjustment command, transmitted from the command transmitting entity, to adjust the issuance order of the execution commands. A storage area for storing the execution commands and a storage area for storing the adjustment command are separately secured; and when the adjustment command is stored, an execution command received after the reception of the adjustment command is issued on the condition that the issuance of execution commands received prior to the reception of the adjustment command has been completed.

According to such an embodiment, depending on whether an adjustment command is stored or not, the command execution controlling apparatus determines whether or not to adjust the issuance order of execution commands according to the receiving timing of the adjustment command.

Another embodiment according to the present invention relates to a command execution instructing apparatus. This apparatus transmits execution commands to a plurality of command execution controlling apparatus. When the issuance order of execution commands in the command execution controlling apparatus is to be adjusted, an adjustment command is transmitted to a command execution controlling apparatus which is targeted among the plurality of command execution controlling apparatuses.

An embodiment according to the present invention relates to a command execution controlling apparatus.

This apparatus is such that a register memory is provided additionally to a receiving memory which stores execution commands received from an external command transmitting entity, and when predetermined data are written to the register memory, the issuance, of an execution command received after the write, from the receiving memory is stopped.

According to such an embodiment, the command execution controlling apparatus determines whether or not to issue an execution command by whether a write is done to a register memory or not.

Another embodiment according to the present invention relates to a command execution instructing apparatus.

This apparatus is connected to a plurality of command execution controlling apparatuses, and predetermined data are written to a register memory of a command execution controlling apparatus to which the issuance of an execution command is to be stopped, among the plurality of command execution controlling apparatuses.

It is to be noted that those expressing the present invention by a method, an apparatus, a system, a recording medium, a computer program are also effective as the present embodiments.

BRIEF DESCRIPTION OF THE DRAWINGS

FIG. 4 is schematic diagrams to explain a structure of issuance order adjustment processing according to an embodiment.

DETAILED DESCRIPTION OF THE INVENTION

Figure 1:
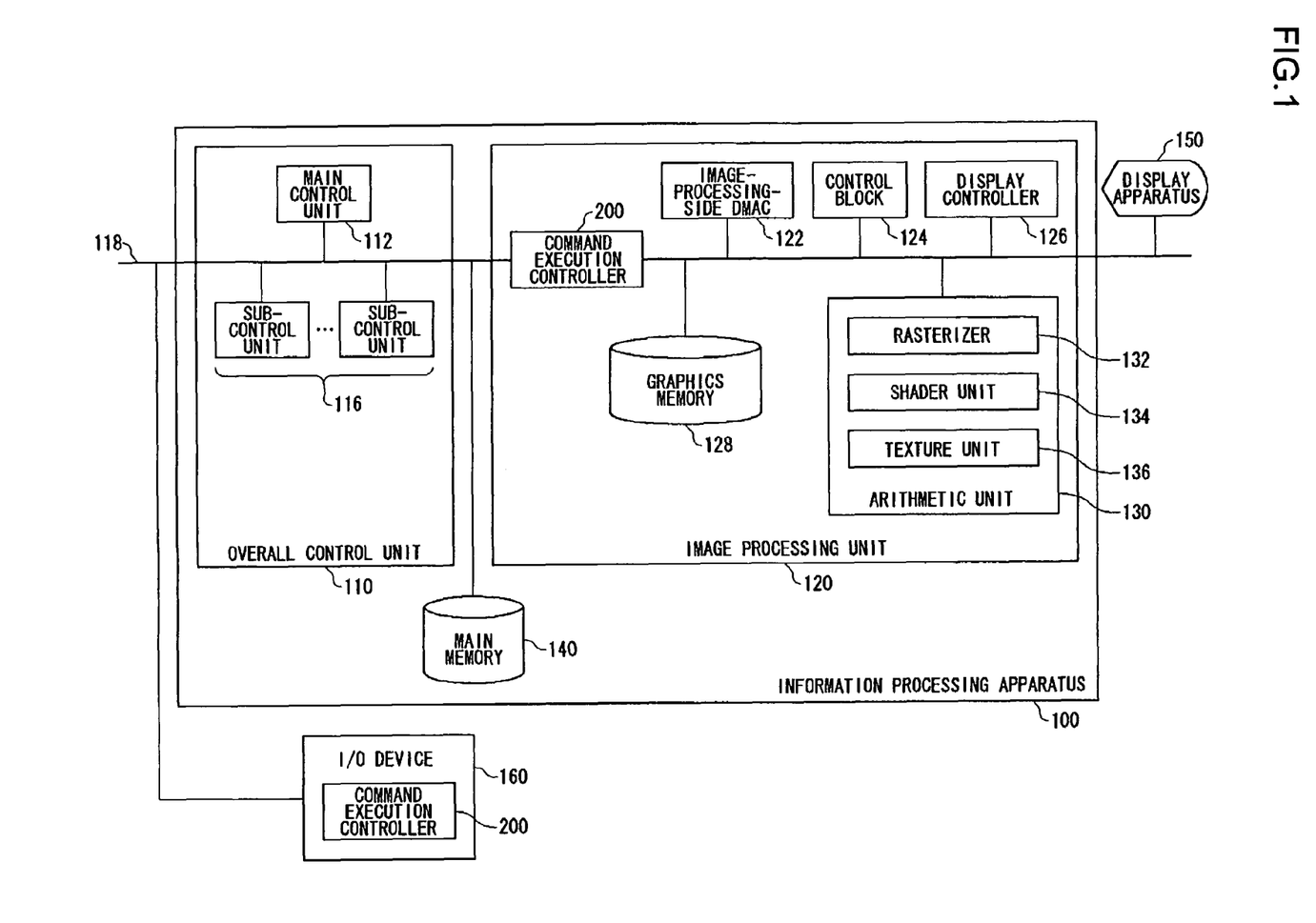
FIG. 1 is a function block diagram of an information processing apparatus.

FIG. 1 is a function block diagram of an information processing apparatus.

An information processing apparatus 100 includes an overall control unit 110, an image processing unit 120 and a main memory 140. The information processing apparatus 100 is connected to a display apparatus 150. The display apparatus 150 outputs the image or video that has been obtained as a result of processing by the overall control unit 110 and the image processing unit 120. The information processing apparatus 100 is also connected via a bus 118 to a variety of I/O devices 160 for controlling external devices. The I/O device 160 to be connected to the information processing apparatus 100 may be in plural numbers or of plural types. The overall control unit 110 and the image processing unit 120 are each preferably formed as a single-chip electronic device and are preferably physically separated from each other. The information processing apparatus 100 may also be formed as an electronic device that further contains these electronic devices.

In terms of hardware, each element described, as a function block for carrying out a variety of processings, as shown in FIG. 1 and the like, can be realized by a CPU (Central Processing Unit), a memory and other LSI (Large Scale Integration). In terms of software, it is realized by memory-loaded programs or the like that have a function of reserved management. Thus, it is understood by those skilled in the art that these function blocks can be realized in a variety of forms such as by hardware only, software only or the combination thereof and are not limited to any of these in particular.

Executed in the information processing apparatus 100 is an operating system (hereinafter referred to simply as "OS (Operation System)") for providing functions and environment for efficient use of the information processing apparatus 100 and controlling the whole apparatus in a unified manner.

The overall control unit 110 includes a main control unit 112 and a plurality of sub-control units 116. The sub-control units 116 and the main control unit 112 can communicate with each other via the bus 118. The main control unit 112 assigns tasks as the element processing of each application, to the respective sub-control units 116. Or the main control unit 112 may execute the tasks by itself. With the sub-control units 116 executing their respectively assigned tasks, a plurality of tasks are processed in parallel with one another.

Hereinbelow, the processings executed by the main control unit 112, including the task assignment processing, are called the "main process", and the processings executed by the sub-control units 116 the "sub-process". The main control unit 112 executes processings for overall control of the information processing apparatus 100, such as a user-interface-related processing which has a relatively high priority. In contrast to this, the sub-control units 116 executes processings subcontracted from the main process, such as calculations executed in the background which have a relatively low priority.

A DMAC (Direct Memory Access Controller), not shown, included in the main control unit 112 or the sub-control units 116 controls data transfer, data save and the like with a built-in graphics memory 128 in the main memory 140 or the image processing unit 120 by a command from the main control unit 112 or the sub-control unit 116.

The main memory 140 is a storage area used mainly by the overall control unit 110. In the main memory 140, data related to the execution status of a task are stored. For example, coordinate data obtained as a result of coordinate calculation concerning computer graphics executed by the overall control unit 110 are stored temporarily. There are also cases where data generated by the image processing unit 120 are saved in this main memory 140.

The image processing unit 120 is a unit that executes image processing, for instance, rendering processing. The image processing unit 120 executes image processing, following the instructions from the overall control unit 110. The image processing unit 120 carries out image processing related to the respective tasks processed by the overall control unit 110 and outputs the generated images or videos to the display apparatus 150. The image processing unit 120 may time-share and execute a plurality of image processings parallelly.

The image processing unit 120 includes a graphics memory 128, an arithmetic unit 130, a display controller 126, a control block 124, an image-processing-side DMAC 122 and a command execution controller 200. These units are connected with one another via the bus 118 and thus the units can communicate with one another.

The graphics memory 128 is a memory area for storing graphics data that are used and managed by the image processing unit 120. Provided in the graphics memory 128 are not only a frame buffer and a Z-buffer, where image frame data are stored, but also areas corresponding to data, such as vertex data, texture data and color lookup table, which are the basic data referred to at the rendering of image frame data.

The control block 124 is a block for controlling the image processing unit 120 as a whole. The control block 124 performs an overall control of the arithmetic unit 130, the graphics memory 128 and the display controller 126 and carries out synchronization management, timer management and the like of data transfer between the respective blocks.

The image-processing-side DMAC 122 controls the data transfer, data save and the like between the overall control unit 110 or the main memory 140 and the graphics memory 128, following a command from the control block 124.

The display controller 126 generates horizontal and vertical synchronization signals and loads, preferably sequentially in a line, the pixel data of image frame data from a frame buffer stored in the graphics memory 128 according to the display timing of the display apparatus 150. Furthermore, the display controller 126 makes an output by converting the pixel data having been loaded in a line, from the digital data comprised of RGB (Red-Green-Blue) color values, into a format corresponding to the display apparatus 150.

The arithmetic unit 130 carries out a variety of arithmetic processings concerning graphics, following the commands from the control block 124. One example of such processing may be a series of rendering processings of generating image frame data through coordinate transformation, hidden-surface elimination and shading based on three-dimensional modeling data and writing them into a frame buffer.

The arithmetic unit 130 includes such function blocks as a rasterizer 132, a shader unit 134 and a texture unit 136 in order to effect a high-speed processing of three-dimensional graphics in particular.

The rasterizer 132 receives vertex data of a basic object to be rendered (hereinafter referred to as "primitive") from the overall control unit 110 and performs a view transformation of converting the primitive on a three-dimensional space into graphics on a rendering plane through a projection transformation. Furthermore, it carries out a raster processing of scanning the graphics on the rendering plane along the horizontal direction of the rendering plane and converting them column by column into quantized pixels. The primitive is pixel-expanded by the rasterizer 132, and the pixel information is calculated for each pixel. The pixel information includes RGB color values, α values indicating transparency, and Z values indicating depth from viewpoints.

The rasterizer 132 generates a pixel area of a predetermined size along the scan lines and outputs it to the shader unit 134 and the texture unit 136. The pixel areas outputted from the rasterizer 132 are once stacked into a queue, and the shader unit 134 processes the stacked pixel areas one by one.

The shader unit 134 carries out a shading processing based on the pixel information calculated by the rasterizer 132, determines the pixel colors after a texture mapping based on the texel information obtained by the texture unit 136, and writes the image frame data after the shading processing in a frame buffer in the graphics memory 128. Furthermore, the shader unit 134 performs processings, such as fogging and alpha blending, on the image frame data written into the frame buffer, determines final rendering colors, and updates the image frame data in the frame buffer.

The texture unit 136 receives parameters specifying texture data from the shader unit 134, reads out the requested texture data from a texture buffer in the graphics memory 128, and outputs them to the shader unit 134 after performing a predetermined processing thereon.

Upon receipt of basic information necessary for image generation, such as the vertex data of a primitive, or a start instruction for image generation from the overall control unit 110, the image processing unit 120 executes image processing independently of the overall control unit 110. The data generated by the image processing unit 120 are transferred to the graphics memory 128 and the main memory 140.

The command execution controller 200 included in the image processing unit 120 controls the issue timing of commands transmitted from the overall control unit 110 to the image processing unit 120. Hereinbelow, of the commands, the control commands for instructing the execution of a task to the command processing entity is called "execution commands", and the auxiliary control commands for having the command execution controller 200 adjust the issue order of execution commands are called "adjustment commands". Also, hereinbelow, the execution commands and the adjustment commands, when collectively referred to, are called "control commands". Adjustment commands and an issue order adjustment processing for adjusting the issue order of execution commands accompanied by the adjustment commands will be described in detail in conjunction with FIG. 4.

The command execution controller 200 receives control commands transmitted not only from the main control unit 112 or the sub-control unit 116 in the overall control unit 110 but also from other devices, such as an I/O device 160. In other words, the command execution controller 200 in the image processing unit 120 collectively receives control commands transmitted from an external command transmitting entity to the image processing unit 120. Upon receipt of an execution command, the command execution controller 200 issues it to the various units, such as the control block 124 or the display controller 126, which are processing entities of said execution command. The respective units included in the image processing unit 120 execute various tasks specified by the execution command issued by the command execution controller 200.

It is to be noted that the command execution controller 200 is mounted not only on the image processing unit 120 but also on the I/O device 160. The command execution controller 200 mounted on the I/O device 160 receives control commands from external command transmitting entities, such as the overall control unit 110 and the image processing unit 120, namely, the information processing unit 100, and issues execution commands to various units inside the I/O device 160.

The command execution controller 200 will be described in detail in conjunction with the following FIG. 2 and FIG. 3.

Figure 2:
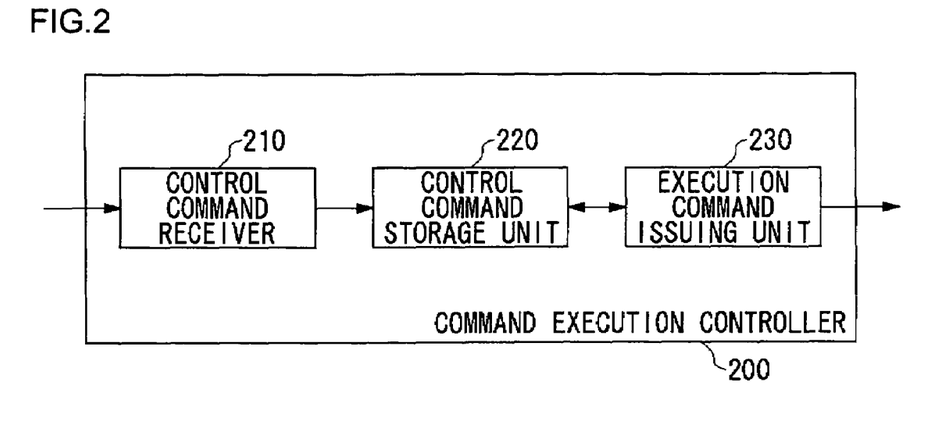
FIG. 2 is a function block diagram of a general command execution controller.

FIG. 2 is a function block diagram of a general command execution controller.

Here, an explanation is made of a command execution controller 200 mounted on an image processing unit 120 on the assumption that the execution command transmitting entity is an overall control unit 110. The command execution controller 200 includes a control command receiver 210, a control command storage unit 220 and an execution command issuing unit 230.

The control command receiver 210 receives execution commands from external command transmitting entities. The control command storage unit 220 stores the received execution commands in a storage area that is secured as a queue. The execution command issuing unit 230 takes out execution commands from the control command storage unit 220 and issues them to each unit which is a command processing entity. Since receive processing and issue processing are executed as separate processes, it is not necessary to synchronize the receive processing and issue processing with each other. That is, the execution commands, as they are received, are stored sequentially in the control command storage unit 220, but the execution command issuing unit 230 issues the execution commands in such an order as may facilitate execution, from among the stored execution commands. Accordingly, the number of execution commands stored in the control command storage unit 220 increases or decreases depending on the receive and issue status. The control command storage unit 220 performs a role as a buffer in realizing the asynchronous operation by the control command receiver 210 and the execution command issuing unit 230.

The control command storage unit 220 stores execution commands in the order of their reception, but the execution commands are issued in an easier-to-execute order. Hence, there is not necessarily an agreement between the receive order and issue order of execution commands. Here, the circumstances in which execution commands are issued in an easier-to-execute order may, for example, be a case where an execution command to the control block 124 is received after a plurality of execution commands to the arithmetic unit 130 are received. In a case like this, the processing as a whole will be carried out more efficiently if the execution commands are issued to the control block 124 while the arithmetic unit 130 is processing the execution commands rather than if the execution commands are issued after waiting for the completion of the processing of all the execution commands by the arithmetic unit 130. In this manner, the command execution controller 200 controls, if necessary, the issue order in such a manner that the execution commands are subjected to an out-of-order execution.

As explained above, the overall control unit 110, which is a command transmitting entity, and the command execution controller 200 operate asynchronously with each other as regards the transmission and reception of commands. However, among the execution commands, there are commands whose issue after the completion of issue of all the execution commands stored in the command execution controller 200 must be guaranteed (hereinafter referred to as "synchronous type execution commands"). An example of such a case is where, after an execution command for specifying the execution of an arithmetic operation is issued, an execution command for acquiring the results of the arithmetic operation is issued.

Generally speaking, there is a method in which the overall control unit 110 transmits an execution command (hereinafter referred to as "dummy read command") as a so-called dummy read command, and, upon confirming that the dummy read command has been executed, transmits a synchronous type execution command (hereinafter referred to as "first method"). In so doing, the overall control unit 110 has to be waiting during the period from the transmission of the dummy read command to the confirmation of the execution thereof.

As another method, there is a method in which the overall control unit 110 transmits an execution command as a so-called flash command (hereinafter referred to as "flash command") (hereinafter referred to as "the second method"). The flash command, which is a kind of an execution command, is stored in the control command storage unit 220. If there is a flash command in the control command storage unit 220, the execution command issuing unit 230 must take care that any execution command having been received after the reception of the flash command is not issued before the execution command having been received before the reception of the flash command.

The size of a queue at the control command storage unit 220 is increasing to cover the latency due to the increase in the number of pipeline stages or the higher speed of operating frequency. The first method is such that the longer the queue is, the stronger the tendency is to increase the load on the issue order adjustment processing by the command execution controller 200. Even at present, there are cases where 10,000-cycles or over are consumed as the operating frequency of the CPU for such issue order adjustment processing.

Furthermore, a conventional command transmitting entity in the second method broadcasts the flash command to all the command receiving entities that are connected thereto. Yet, the transmitting method like this forces a processing for the flash command on all the command receiving entities and tends to worsen the processing efficiency as a whole.

Figure 3:
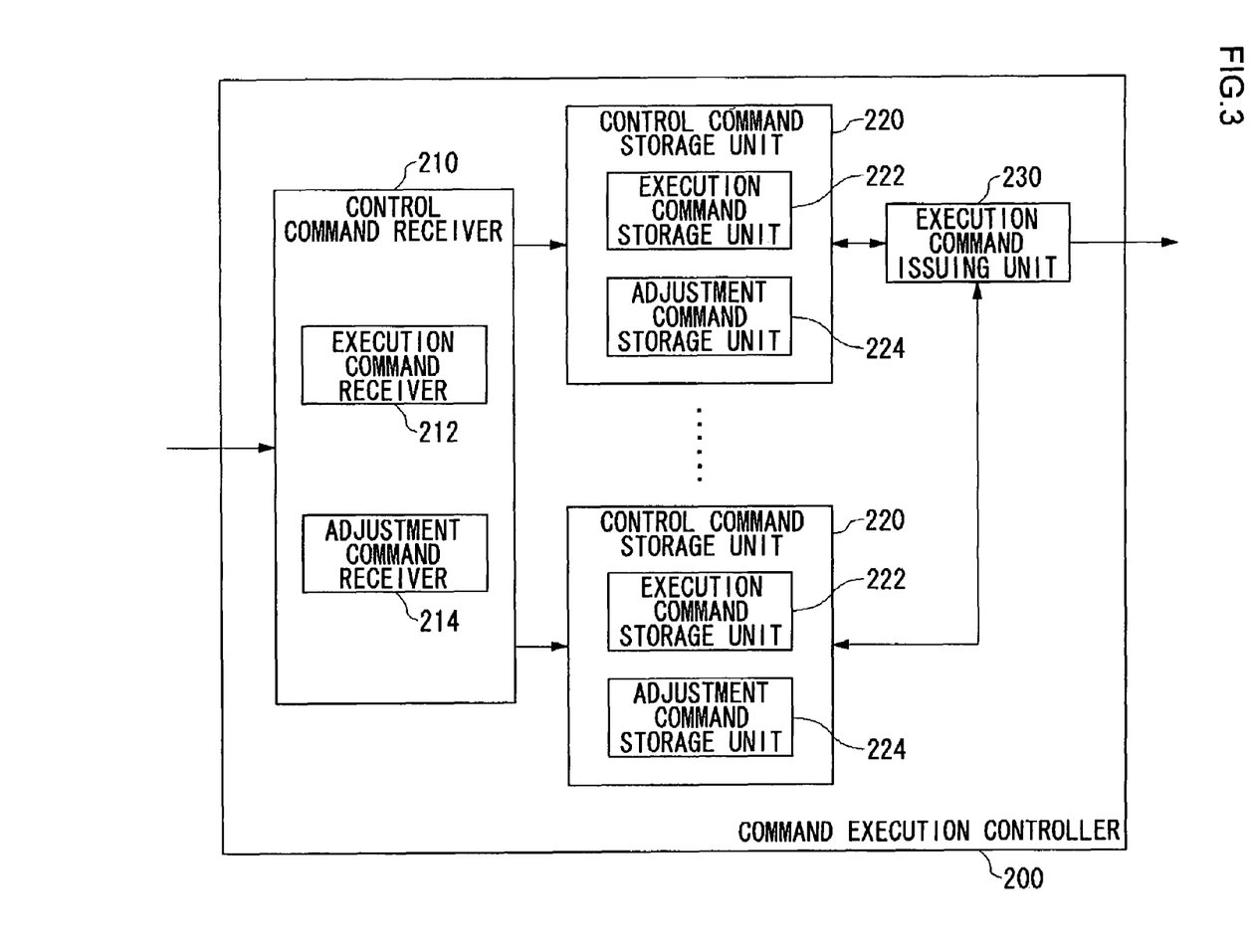
FIG. 3 is a function block diagram of a command execution controller according to an embodiment.

FIG. 3 is a function block diagram of a command execution controller according to the present embodiment.

Here, too, an explanation is made of a command execution controller 200 mounted on an image processing unit 120. The command execution controller 200 includes a control command receiver 210, a control command storage unit 220 and an execution command issuing unit 230.

The control command receiver 210 includes an execution command receiver 212 and an adjustment command receiver 214. The execution command receiver 212 receives execution commands from a main control unit 112 and sub-control units 116 in an overall control unit 110. The adjustment command receiver 214 receives adjustment commands from the main control unit 112 and sub-control units 116 in the overall control unit 110. Note that control commands may also be received from other I/O devices 160.

The control command storage unit 220 may be a single unit, but the following explanation according to the present embodiment is of the case where a plurality of control command storage units 220 are provided in correspondence to the command transmitting entities. For example, if the command execution controller 200 in the image processing unit 120 is to receive commands from one main control unit 112 and eight sub-control units 116, a total of nine control command storage units 220 will be provided in correspondence to the respective command transmitting entities.

A control command storage unit 220 includes an execution command storage unit 222 and an adjustment command storage unit 224. The execution command storage unit 222 stores a plurality of execution commands. The adjustment command storage unit 224 stores adjustment commands. The storage area for the execution command storage unit 222 to store execution commands and the storage area for the adjustment command storage unit 224 to store adjustment commands may be secured in physically separate memories. Or they may be secured as separate storage areas within the physically same memory. In this embodiment, the storage area of adjustment commands in the adjustment command storage unit 224 is provided by a physically separate register memory that is placed side by side with a memory providing the storage area of execution commands in the execution command storage unit 222.

Upon receipt of an execution command, the execution command receiver 212 identifies the control command storage unit 220 which is associated with the command transmitting entity of the transmitting source. Then it has the execution command storage unit 222 of the identified control command storage unit 220 store the execution command.

Upon receipt of an adjustment command, the adjustment command receiver 214 identifies the control command storage unit 220 which is associated with the command transmitting entity of the transmitting source. Then it has the adjustment command storage unit 224 of the identified control command storage unit 220 store the adjustment command.

The execution command issuing unit 230 issues execution commands from execution command storage units 222 in the respective control command storage unit 220 to units which will be the processing entities. The execution command issuing unit 230 makes the rounds and selects control command storage units 220 from which it has to take out execution commands. Then it takes out the execution commands as appropriate from the respective execution command storage units 222 and issue them to the respective units.

The number of execution commands that each execution command storage unit 222 can store (hereinafter referred to as "maximum storable command count") may vary from one to the other depending on the command transmitting entities. For example, a larger maximum storable command count may be set for a control command storage unit 220 associated with a command transmitting entity that issues more execution commands to the image processing unit 120 than for the other control command storage units 220. Or there may be provided a control unit that changes the maximum storable command counts for the respective execution command storage units 222 dynamically according to the state of execution command reception.

According to the embodiment such as this, the maximum storable command counts for the respective execution command storage units 222 may be set appropriately, so that the storage capacity of the command execution controller 200 as a whole may be allotted efficiently. Also, with a plurality of control command storage units 220 set in association with command transmitting entities, even when an execution command storage unit 222 overflows due to a large amount of execution commands transmitted by a specific command transmitting entity, the other command transmitting entities can issue their execution commands without being affected thereby.

Setting of a plurality of control command storage units 220 in association with command transmitting entities provides merits to the side of command transmitting entities as well. Suppose, for instance, that while a first command transmitting entity is transmitting many execution commands, a second command transmitting entity transmits an execution command. Even in this kind of situation, the execution command issuing unit 230 selects a plurality of control command storage units 220 equally. This makes it less likely that the second command transmitting entity has to wait unduly for the issue of an execution command depending on the state of transmission by the first command transmitting entity. In other words, it is easier to equalize the execution command, issue wait time for the command transmitting entities.

Also, it is not always necessary that control command storage units 220 be provided in association with command transmitting entities. For example, the control command storage units 220 may be provided in association with command executing entities in the image processing unit 120. The data packet of an adjustment command may include a storage destination specifying area for specifying any of a plurality of adjustment command storage units 224. The main control unit 112 and the sub-control units 116, which are command transmitting entities, transmit adjustment commands by writing an ID for identifying an adjustment command storage unit 224 in this storage destination specifying area when transmitting the adjustment commands to the command execution controller 200. By referring to the ID indicated in the storage destination specifying area of the received adjustment command, the adjustment command receiver 214 transfers the adjustment command to any one of the adjustment command storage units 224. It goes without saying that the storage destination specifying area like this may be included in the execution command as well. In such a case, the execution command receiver 212, by referring to the ID indicated in the storage destination specifying area of the received execution command, transfers the execution command to any one of the execution command storage units 222.

It is to be noted that a storage destination specifying area may be an area where an operand of an instruction in an adjustment command is specified.

In a storage destination specifying area, an ID for identifying a command executing entity may be written. In this case, the execution command receiver 212 or the adjustment command receiver 214 selects a control command storage unit 220 associated with the command executing entity specified by the ID as the destination to which the control command is transferred.

A command transmitting entity, such as a main control unit 112, may also broadcast an adjustment command written with an ID specifying a command executing entity to a plurality of command execution controllers 200. In this case, a command execution controller 200 which does not include the control command storage unit 220 to be specified by the ID cancels the received adjustment command. On the other hand, the command execution controller 200 which includes the specified control command storage unit 220 transfers the adjustment command to the control command storage unit 220. According to this mode, even when an adjustment command is broadcasted, it is possible to prevent undue processing load from working on unrelated command execution controllers 200.

The execution command and the adjustment command may be transmitted and received as packet data of the same format. For example, it may be such that a predetermined bit in the packet data of a control command being ON means an execution command and it being OFF means an adjustment command. A control command receiver 210 may determine whether the received control command is an execution command or an adjustment command by detecting the ON or OFF of this bit. Then it may select any one of the control command storage units 220 by referring to the storage destination specifying area in the control command.

Another example will be described. A control command includes a transmission destination address as the destination address of a write command. A control command receiver 210 may select a control command storage unit 220 according to this transmission destination address. For example, a control command receiver 210 may possess a selection table in which transmission destination addresses are associated with different control command storage units 220. And, by referring to this selection table, the execution command receiver 212 and the adjustment command receiver 214 in a control command receiver 210 may select a control command storage unit 220 in accordance with the transmission destination address in the control command as the destination for transfer.

Next, an explanation will be made of the principle of issue order adjustment processing in the present embodiment, in which the issue order of execution commands is adjusted by the adjustment commands retained in the adjustment command storage unit 224.

FIG. 4 are schematic diagrams to explain a structure of issuance order adjustment processing according to the present embodiment.

FIG. 4A to FIG. 4E illustrate, by examples, temporal flows when an execution command issuing unit 230 issues execution commands while a control command receiver 210 receives execution commands and adjustment commands.

Figure 4A:
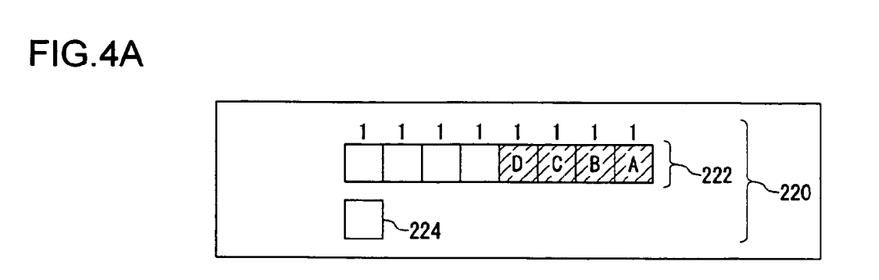
FIG. 4A is a schematic diagram showing a first state in an issuance order adjustment processing according to the present embodiment.

FIG. 4A is a schematic diagram showing a first state in the issuance order adjustment processing according to the present embodiment. In the first state, the execution command storage unit 222 stores execution commands A, B, C and D. The adjustment command storage unit 224 does not hold an adjustment command. A flag is provided in each storage area of the execution command storage unit 222. In the same figure, "1" or "0" described right above each area is this flag. An execution command, stored in an area whose flag is "1", indicates that it can be issued. An execution command, stored in an area whose flag is "0" indicates that it cannot be issued. In the first state, the flags are "1" in all areas of the execution command storage unit 222. Accordingly, the execution command issuing unit 230 issues any one of the execution commands in an easier-to-execute order among the execution commands A, B, C and D.

Figure 4B:
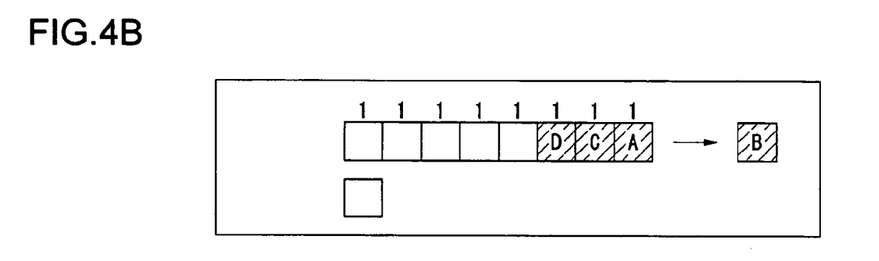
FIG. 4B is a schematic diagram showing a second state in the issuance order adjustment processing according to the present embodiment.

FIG. 4B is a schematic diagram showing a second state in the issuance order adjustment processing according to the present embodiment. The second state is a state after the execution command B has been issued, shifted from the first state. The execution command storage unit 222 stores execution commands A, C and D.

Here, assume that an adjustment command is received and the adjustment command is stored in the adjustment command storage unit 224.

Figure 4C:
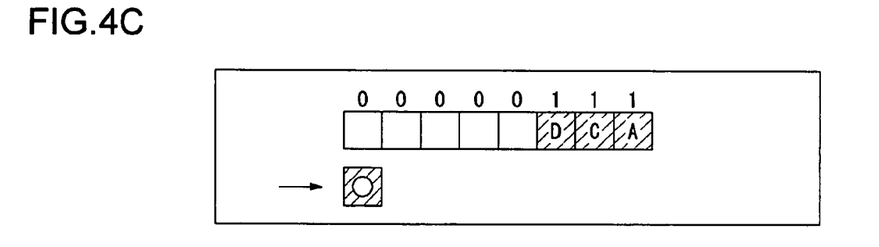
FIG. 4C is a schematic diagram showing a third state in the issuance order adjustment processing according to the present embodiment.

FIG. 4C is a schematic diagram showing a third state in the issuance order adjustment processing according to the present embodiment. The third state is a state after the adjustment command has been stored, shifter from the second state. At this point, the flags of areas where the execution commands A, C and D are stored remain to be "1" whereas the flags of the other areas become "0".

Here, assume that an execution command E is received.

Figure 4D:
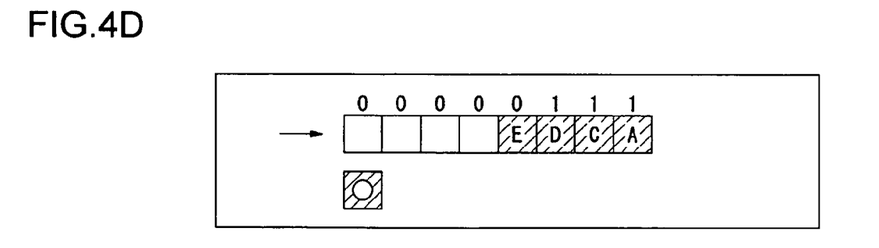
FIG. 4D is a schematic diagram showing a fourth state in the issuance order adjustment processing according to the present embodiment.

FIG. 4D is a schematic diagram showing a fourth state in the issuance order adjustment processing according to the present embodiment. The fourth state is a state after the execution command E has been received, shifted from the third state. The flags of areas at which the execution commands A, C and D are stored are "1". The flag of area where the execution command E, which was received after the reception of the adjustment command, is "0". Accordingly, the execution commands A, C and D can be issued whereas the execution command E cannot be issued.

Here, assume that the execution command B is issued and at the same time an execution command F is newly issued.

Figure 4E:
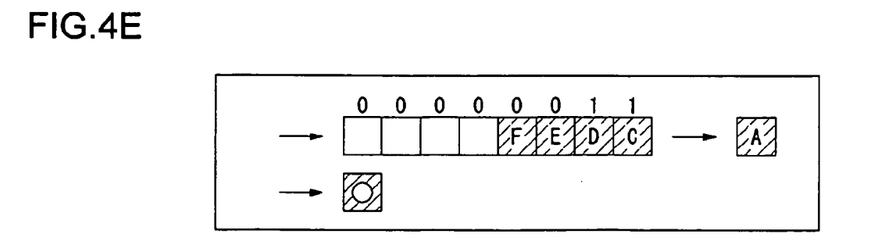
FIG. 4E is a schematic diagram showing a fifth state in the issuance order adjustment processing according to the present embodiment.

FIG. 4E is a schematic diagram showing a fifth state in the issuance order adjustment processing according to the present embodiment. The fifth state is a state, shifted from the fourth state, where the execution command A has been issued and at the same time an execution command F has been newly stored. The flags of areas at which the execution commands C and D received prior to the reception of the adjustment command are "1". The flags of the execution commands E and F received after the reception of the adjustment command are "0". Accordingly, the execution commands C and D can be issued whereas the issuance of the execution commands E and F is not granted. Until such time as the issuance of the execution commands C and D has been completed, the issuance of the execution commands E and F will not be permitted.

In the command execution controller 200, a plurality of control command storage units 220 are provided corresponding to a plurality of command transmitting entities. In each control command storage 220, an execution command storage 222 and an adjustment command storage unit 224 are provided as a pair. When an adjustment command is stored in a certain adjustment command storage 224, the execution command issuing unit 230 performs issuance order adjustment processing on an execution command storage 222 which pairs with said adjustment command storage 224. However, the issuance order adjustment processing is not performed on the other execution command storage units 222. Thus, it is possible to carry out issuance order adjustment processing per command transmitting entity.

Figure 5:
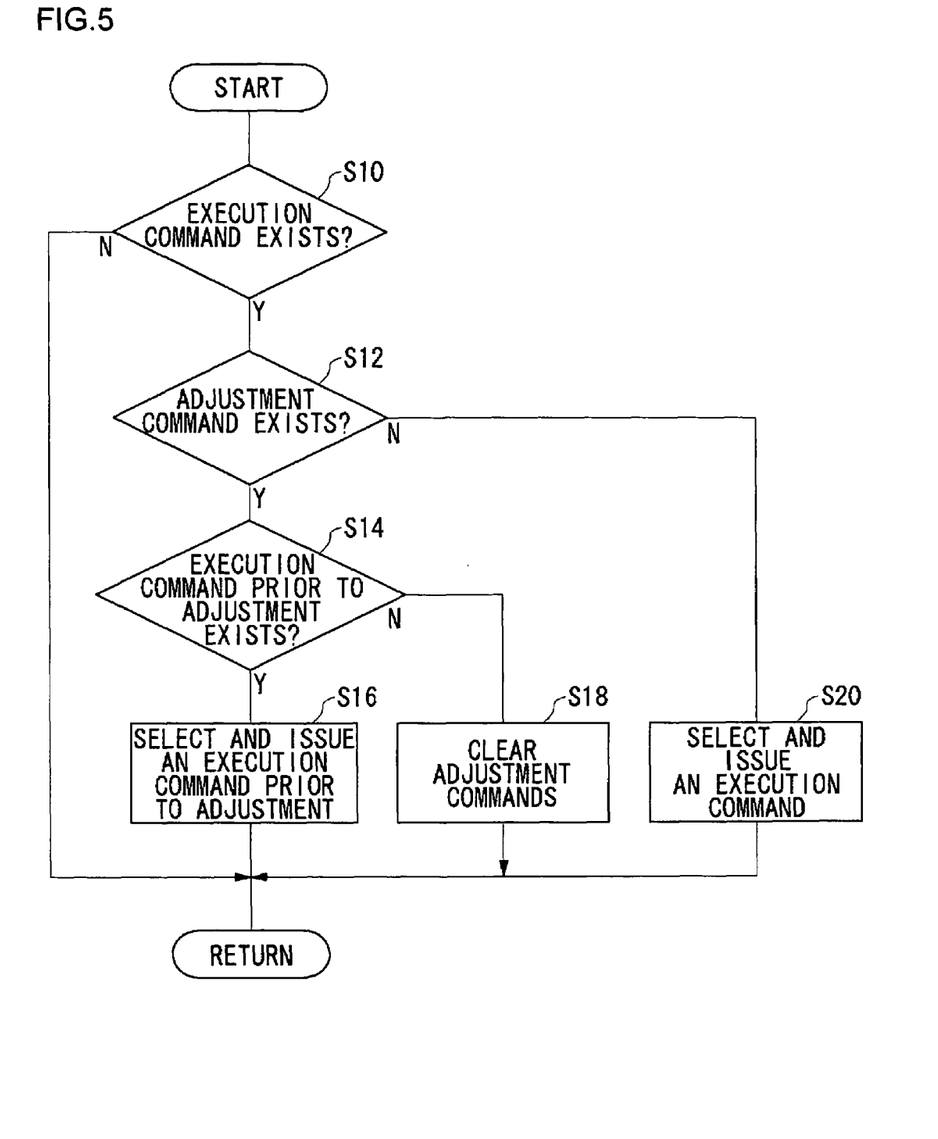
FIG. 5 is a flowchart showing processing stages for issuing an execution command.

FIG. 5 is a flowchart showing processing stages for issuing an execution command.

Shown here are processing stages carried out when the execution command issuing unit 230 issues execution commands for a certain specified control command storage unit 220. The processing shown in the same flowchart is a repeatedly executing loop processing.

Firstly, the execution command issuing unit 230 determines if any execution command is stored (S10). If no execution command is stored (N of S10), the execution command issuing unit 230 changes the processing target to other control command storage units 220. If an execution command or execution commands is/are stored (Y of S10), the execution command issuing unit 230 determines if any adjustment command is stored (S12). If no adjustment command is stored (N of S12), the execution command issuing unit 230 selects any execution command, among all the execution commands stored in the execution command storage unit 22, and issues it (S220).

If, on the other hand, an adjustment command or adjustment commands is/are stored (Y of S12), the execution command issuing unit 230 determines if an execution command which has been received prior to the reception of the adjustment command is stored. If such execution command(s) exist (Y of S14), the execution command issuing unit 230 selects any execution command from among these execution commands and issues it (S16). If it does not exist (N of S14), the execution command issuing unit 230 deletes the adjustment command (S18). When the adjustment command is deleted, every flag of the respective areas in the execution command storage unit 22 is set to "1". That is, all the execution commands stored in the execution command storage unit 222 can be issued.

According to the present embodiment, the main control unit 112 and sub-control units 116, in the overall control unit 110, which are equivalent to the command transmitting entities for the image processing apparatus 120 are equipped with a function to transmit adjustment commands as well as a function to transmit execution commands. Although these units serve as command transmitting entities for a plurality of command receiving entities, they transmit execution commands to only the command receiving entities which are to become processing entities. Similarly, it is preferred that these units transmit adjustment commands to only the command execution controller 200 which is to execute the issuance order adjustment processing.

According to such a method of transmitting adjustment commands, the processing of command receiving entities which are not to undergo the issuance order adjustment processing will not be affected by the adjustment commands for the other command receiving entities, compared to the conventional broadcast of flash commands by the second method.

As above, according to the present embodiments, the command execution controller 200 stores the execution commands and the adjustment commands in the separately secured storage areas. Accordingly, as long as the adjustment command storage units 224 only are watched over, the execution command issuing unit 230 can determine whether the issuance order adjustment processing shall be executed or not. This can prevent the processing efficiency accompanied by the increased maximum storable command count of the execution command storage unit 222 as in the conventional second method from being deteriorated. The logic of issuance order adjustment processing becomes simplified, compared with the second method.

Moreover, even at the issuance of synchronous type execution commands, it is not necessary to synchronize with the command execution controller 200 as in the first method.

In the present embodiments, the description has been made in a manner that it was assumed that the execute commands or adjustment commands are transmitted and received between the command transmitting entities and the command receiving entities. However, the command transmitting entity may write the execution commands or adjustment commands to the execution command storage unit 222 or adjustment command storage unit 224 in the command execution controller 200.

The present invention has been described based on the embodiments. These embodiments are merely exemplary, and it is understood by those skilled in the art that various modifications to the combination of each component and process thereof are possible and that such modifications are also within the scope of the present invention.

It is to be noted that predetermined data written to a register memory described in WHAT IS CLAIMED corresponds to an adjustment command in the present embodiment. It is also understood by those skilled in the art that the function achieved by each constituent element described in these Claims is realized by a single unit of each function block indicated in the present embodiments or in linkage with those.

In addition, the contents explained relative to FIGS. 4A to 4E explain the principle of the issuance order adjustment processing in the present embodiments, and other various specific methods by which to realize it are also conceivable. For example, a management may be such that the execution commands received before the reception of an adjustment command are enrolled as a first group whereas the execution commands received after the reception of the adjustment command are enrolled as a second group. In this case, the execution command issuing unit 230 may start the issuance of the execution commands belonging to the second group, on the condition that the issuance of the execution commands belonging to the first group have been completed.

Alternatively, the execution command storage unit 222 may store the execution commands in a first storage area and a second storage area, which are separate storage areas from each other. The first storage area is an area which is given priority than the second storage area. That is, the execution commands received before the reception of an adjustment command is stored in the first storage area whereas the execution commands received after the reception of the adjustment command is stored in the second storage area. The execution commands are normally stored in the first storage area. However, when an adjustment command is received, the execution commands received thereafter are stored in the second storage area.

The execution command issuing unit 230 starts the issuance of execution commands stored in the second storage area, on the condition that the issuance of execution commands stored in the first storage area has been completed. When the execution commands stored in the first storage area have been exhausted, the second storage area is changed to as an area which is given a higher priority than the first storage area. Although the execution commands received thereafter are stored in the second storage area, the execution commands received after the reception of an adjustment command again will be stored in the first storage area. This time, the execution command issuing unit 230 starts the issuance of the execution commands stored in the first storage area, on the condition that the issuance of the execution commands stored in the second storage area has been completed. In this manner, the control command storage units 220 in the command execution controller 200 may be provided with the first storage area and the second storage area where the execution commands are given the order of priority in terms of the issuance thereof, and the order of priority in issuance may be changed every time an adjustment command is received.

According to such embodiments, the issuance order adjustment processing can be suitably executed if, as a matter of practice, the issue priority orders in two queues are interchanged.

While the preferred embodiments of the present invention have been described using specific terms, such description is for illustrative purposes only, and it is to be understood that changes and variations may be made without departing from the spirit or scope of the appended claims.

What is claimed is:

1. A command execution controlling apparatus, comprising:
    an execution command receiver which receives execution commands from an external command transmitting entity;
    an execution command storage unit which stores the received execution commands wherein a predetermined upper-limit number of execution commands to be stored is set;
    an execution command issuing unit which retrieves the execution commands stored in said storage unit and issues them to a command execution entity according to an issuance order determined among the execution commands;
    an adjustment command receiver which receives an adjustment command, transmitted from the command transmitting entity, to adjust the issuance order of the execution commands; and
    an adjustment command storage unit which stores the adjustment command received by said adjustment command receiver,
    wherein a storage area for storing the execution commands to be stored in said execution command storage unit and a storage area for storing the adjustment command to be stored in said adjustment command storage unit are separately secured, and
    wherein said execution command issuing unit sets an identifier to differentiate between execution commands received prior to the reception of the adjustment command and execution commands received after the reception of the adjustment command, and when the adjustment command is stored, said execution command issuing unit issues an execution command received after the reception of the adjustment command as an issuance order adjustment processing, on the condition that the issuance of execution commands received prior to the reception of the adjustment command is determined to be completed by referring to the identifier.

2. A command execution controlling apparatus according to claim 1, wherein said execution command storage unit stores the execution commands in accordance with a receiving order of the execution commands, and
    wherein said execution command issuing unit issues the execution commands in the order not necessarily identical to the receiving order thereof.

3. A command execution controlling apparatus according to claim 1, wherein said execution command storage unit and said adjustment command storage unit are respectively provided as separate memories.

4. A command execution controlling apparatus according to claim 1, wherein a plurality of pairs of said execution command storage unit and said adjustment command storage unit are provided,
    wherein the adjustment command contains storage destination specifying information to specify any of a plurality of adjustment command storage units,
    wherein, by referring to the storage destination specifying information in the adjustment command, said adjustment command receiver selects an adjustment command storage unit which is to store the adjustment command, and
    wherein when an adjustment command is stored, said execution command issuing unit performs the issuance order adjustment processing on an execution command storage unit which is provided to pair with said adjustment command storage unit that stores said adjustment command.

5. A command execution controlling apparatus according to claim 1, wherein a plurality of pairs of said execution command storage unit and said adjustment command storage unit are provided, wherein, according to a transmitting destination address contained in an adjustment command, said adjustment command receiver selects an adjustment command storage unit which is to store said adjustment command, and wherein when an adjustment command is stored, said execution command issuing unit performs the issuance order adjustment processing on an execution command storage unit which is provided to pair with said adjustment command storage unit that stores said adjustment command.

6. A command execution controlling apparatus according to claim 1, wherein, for a plurality of command transmitting entities, a pair of said execution command storage unit and said adjustment command storage unit is provided for each of command transmitting entities, wherein said execution command receiver has an execution command storage unit, associated with the command transmitting entity of a transmitting source, store the received execution command, wherein said adjustment command receiver has an adjustment command storage unit, associated with the command transmitting entity of a transmitting source, store the received adjustment command, and wherein when an adjustment command is stored, said execution command issuing unit performs the issuance order adjustment processing on an execution command storage unit provided as a pair with said adjustment command storage unit that stores said adjustment command.

7. A command execution controlling apparatus according to claim 1, wherein the apparatus is so formed together with a command executing entity, which is an issuing destination of the execution command, as to be contained in a single chip electronic device.

8. A command execution controlling apparatus according to claim 1, wherein as an electronic device the apparatus is so formed as to be physically different from the command transmitting entity.

9. A command execution instructing apparatus, connected to a plurality of command execution controlling apparatuses according to claim 1, the apparatus comprising, as the command transmitting entity:

an execution command transmitter which transmits an execution command to the plurality of command execution controlling apparatuses; and an adjustment command transmitting unit which transmits the adjustment command to a command execution controlling apparatus, among the plurality of command execution controlling apparatuses, which is to request the execution of the issuance order adjustment processing.

10. A command execution instructing apparatus, connected to a command execution controlling apparatus according to claim 4, the apparatus comprising, as the command transmitting entity:

an execution command transmitter which transmits an execution command to the command execution controlling apparatus; and an adjustment command transmitting unit which transmits an adjustment command that contains storage destination specifying information by which to specify, as a storage destination, one of a plurality of adjustment command storage units provided in the command execution controlling apparatus.

11. A command execution controlling apparatus, characterized in that a register memory is provided additionally to a receiving memory which stores execution commands received from an external command transmitting entity, and when predetermined data are written to the register memory, an identifier differentiating between execution commands received prior to the write in the register memory and execution commands received after the write is set, and the issuance, of an execution command received after the write, from the receiving memory is stopped, until the issuance of execution commands received prior to the reception of the predetermined data is determined to be completed by referring to the identifier.

12. A command execution controlling apparatus according to claim 11, wherein register memories are additionally provided respectively for a plurality of receiving memories, and wherein when the predetermined data are written to the register memory, the issuance, of an execution command received after the write, from the receiving memory provided in parallel with the register memory is stopped.

13. A command execution controlling apparatus according to claim 12, wherein even when the predetermined data are written to the register memory, the issuance of an execution command, from receiving memories provided in parallel with the other register memories to which the predetermined data are not written is not stopped.

14. A command execution instructing apparatus, connected to a plurality of command execution controlling apparatuses according to claim 11, serving as the command transmitting entity, wherein the predetermined data are written to only the register memory of a command execution controlling apparatus, to which the issuance of an execution command is to be stopped, among the plurality of command execution controlling apparatuses.

15. A method for controlling command execution, the method comprising:

receiving execution commands from an external command transmitting entity;

storing the received execution commands wherein a predetermined upper-limit number of execution commands to be stored is set;

retrieving the stored execution commands and issuing them to a command execution entity according to an issuance order determined among the execution commands;

receiving an adjustment command, transmitted from the command transmitting entity, to adjust the issuance order of the execution commands; and storing the received adjustment command in a storage area which is provided separately from a storage area for storing the execution commands, wherein said execution command issuing unit sets an identifier to differentiate between execution commands received prior to the reception of the adjustment command and execution commands received after the reception of the adjustment command, and when the adjustment command is stored, an execution command received after the reception of the adjustment command is issued as an issuance order adjustment processing, on the condition that the issuance of execution commands received prior to the reception of the adjustment command is determined to be completed by referring to the identifier.

16. A method for controlling command execution according to claim 15, wherein the execution commands are issued in the order not necessarily identical to the receiving order thereof.

17. A method for controlling command execution, characterized in that in an apparatus where a register memory is provided additionally to a receiving memory for storing execution commands received from an external command transmitting entity, and when predetermined data are written to the register memory, an identifier differentiating between execution commands received prior to the write in the register memory and execution commands received after the write is set, and the issuance, of an execution command received after the write, from the receiving memory is stopped, until the issuance of execution commands received prior to the reception of the predetermined data is determined to be completed by referring to the identifier.

18. A method for controlling command execution according to claim 17, wherein when the predetermined data are written to any of a plurality of register memories which are additional provided respectively for a plurality of receiving memories, the issuance, of an execution command received after the write, from a receiving memory provided in parallel with the register memory is stopped.

19. A method for controlling command execution according to claim 18, wherein even when the predetermined data are written to the register memory, the issuance of an execution command from receiving memories provided in parallel with the other register memories to which the predetermined data are not written is not stopped.

20. A command execution controlling program stored on a computer readable storage medium and executable by a computer, the program including the functions of:

receiving execution commands from an external command transmitting entity;

storing the received execution commands wherein a predetermined upper-limit number of execution commands to be stored is set;

retrieving the stored execution commands and issuing them to a command execution entity according to an issuance order determined among the execution commands;

receiving an adjustment command, transmitted from the command transmitting entity, to adjust the issuance order of the execution commands;

storing the received adjustment command in a storage area which is provided separately from a storage area for storing the execution commands, wherein said execution command issuing unit sets an identifier to differentiate between execution commands received prior to the reception of the adjustment command and execution commands received after the reception of the adjustment command; and issuing an execution command received after the reception of the adjustment command, as an issuance order adjustment processing, on the condition that the issuance of execution commands received prior to the reception of the adjustment command is determined to be completed by referring to the identifier, when the adjustment command is stored.

21. A command execution controlling program stored on a computer readable storage medium and executable by a computer, the program including the functions of:

storing execution commands received from an external command transmitting entity in a receiving memory of an apparatus where a register memory is provided additionally to the receiving memory setting an identifier differentiating between execution commands received prior to the write in the register memory and execution commands received after the write when predetermined data are written to the register memory, and stopping the issuance of an execution command received after the write from the receiving memory, until the issuance of execution commands received prior to the reception of the predetermined data is determined to be completed by the referring to the identifier.

22. A recording medium, readable by a computer, which stores a command execution controlling program executable by a computer, the program including the functions of:

receiving execution commands from an external command transmitting entity;

storing the received execution commands wherein a predetermined upper-limit number of execution commands to be stored is set;

retrieving the execution commands stored and issuing them to a command execution entity according to an issuance order determined among the execution commands; receiving an adjustment command, transmitted from the command transmitting entity, to adjust the issuance order of the execution commands;

storing the received adjustment command in a storage area which is provided separately from a storage area for storing the execution commands, wherein said execution command issuing unit sets an identifier to differentiate between execution commands received prior to the reception of the adjustment command and execution commands received after the reception of the adjustment command; and issuing an execution command received after the reception of the adjustment command, as an issuance order adjustment processing, on the condition that the issuance of execution commands received prior to the reception of the adjustment command is determined to be completed by referring to the identifier, when the adjustment command is stored.

23. A recording medium, readable by a computer, which stores a command execution controlling program executable by a computer, the program characterized in that in an apparatus where a register memory is provided additionally to a receiving memory for storing execution commands received from an external command transmitting entity, and when predetermined data are written to the register memory, an identifier differentiating between execution commands received prior to the write in the register memory and execution commands received after the write is set, and the issuance, of an execution command received after the write, from the receiving memory is stopped, until the issuance of execution commands received prior to the reception of the predetermined data is determined to be completed by referring to the identifier.

* * * * *